Oct. 31, 1967 T. F. PIEL 3,350,190
SPRAY MIST PROPORTIONING SYSTEM FOR GLASS MACHINE
Filed Dec. 18, 1963 2 Sheets-Sheet 1

INVENTOR.
THEODORE F. PIEL
BY
W. A. Schaich and John R. Nelson
ATTORNEYS

INVENTOR.
THEODORE F. PIEL
BY
W.A. Schaich and John R. Nelson
ATTORNEYS

United States Patent Office 3,350,190
Patented Oct. 31, 1967

3,350,190
SPRAY MIST PROPORTIONING SYSTEM
FOR GLASS MACHINE
Theodore F. Piel, Toledo, Ohio, assignor to Owens-Illinois, Inc., a corporation of Ohio
Filed Dec. 18, 1963, Ser. No. 331,427
9 Claims. (Cl. 65—355)

This invention relates generally to method and apparatus for cooling molds used in forming hollow glassware and more particularly to precision control of the quantity of water employed in a spray mist used to increase cooling rates and operating speed of glass molding apparatus.

Heretofore air cooling has been used as a primary medium for cooling glassware after expansion in the mold or for cooling inner and outer mold members for pressure molding of glass objects. Efficiency of operation demands increased machine speeds but the use of air for cooling is no longer adequate for the purpose. Higher machine speeds require higher cooling rates since the total amount of heat to be removed increases in proportion to the molding repetition rate for the machine.

Wind velocities for the cooling of molds and of hollow glassware have reached practical limits so that the cost of further increasing the wind velocity to further cool the molds becomes disproportionate. As a further consideration, it has been noted that increase in wind velocity does not produce a proportionate increase in cooling rates. Use of liquid coolants is undesirable for the reason that adjustability is extremely difficult and the mold thicknesses required are too great where a mold member is to be cooled, and direct mold or glass cooling by a liquid may not be generally employed.

A number of means have heretofore been devised for applying a quantity of water to the cooling of a plunger or parison mold when the water is introduced in the form of a spray of fine drops or droplets carried along in a quantity of air into contact either with the mold or with the glass as formed. One example of such apparatus is shown in Patent 2,470,228. Examples of parison and plunger molds where spray cooling to increase speed for efficient operation are shown in Patents 2,688,823 and 3,027,685. In order for spray cooling to be fully effective without causing strains and distortions in the glassware it is important that the drop sizes be controlled and that the quantity of waer present in each unit volume of air be held under close control. Ordinarily it must be an intermittently supplied spray, further complicating the rate control. Prior apparatus has not provided means for precise control of the ratio of water to air in a spray mist, especially when intermittent, nor of the total quantity of water admitted in each pulse for a particular cooling operation. A copending patent application assigned to the same assignee, for Glass Forming Method and Apparatus, by V. F. Berry et al., Ser. No. 153,328, now Patent No. 3,203,777, further describes the variables and criticality of the factors in spray cooling of parison mold and plunger elements in a high speed glass forming machine. Further control of both the water flow rate and injection quantity are desired for increased efficiency of cooling to permit higher forming rates.

It is accordingly an object of the present invention to provide a mist proportioning device for introducing a fixed quantity of water into a spray nozzle upon each actuation of the forming machine.

It is another object to provide for water metering and feeding a spray nozzle at a rate of flow also exactly adjusted.

A further object is to provide method and means for measuring and dispensing a fixed quantity of water automatically in response to an actuation signal.

Other objects and features of the invention will be apparent from the following description taken in connection with the drawings in which.

Applicant achieves the objects of this invention by employment of a water proportioning chamber which may be a cylinder having a piston therein which is caused to operate through a displacement adjusted to provide the desired water volume for a particular stroke, which piston is actuated by double stroking means such as an air cylinder under automatic control of the glass forming machine to provide a pulsed signal causing the air cylinder to be actuated and to expel a water charge, and re-cycled to cause the water cylinder to take a new charge. The rate of delivery of water is controlled preferably by an adjustable air escape valve and in conjunction with a fixed size of spray nozzle. The quantity of water delivered on each stroke is adjustable by adjusting the length of stroke as will hereafter be described. The present invention represents an improved proportioning and control system over that disclosed in patent application Ser. No. 136,519, now Patent No. 3,235,353, for Method and Apparatus for Blowing and Cooling Glassware, by Richard G. Rupli.

Figure 1:
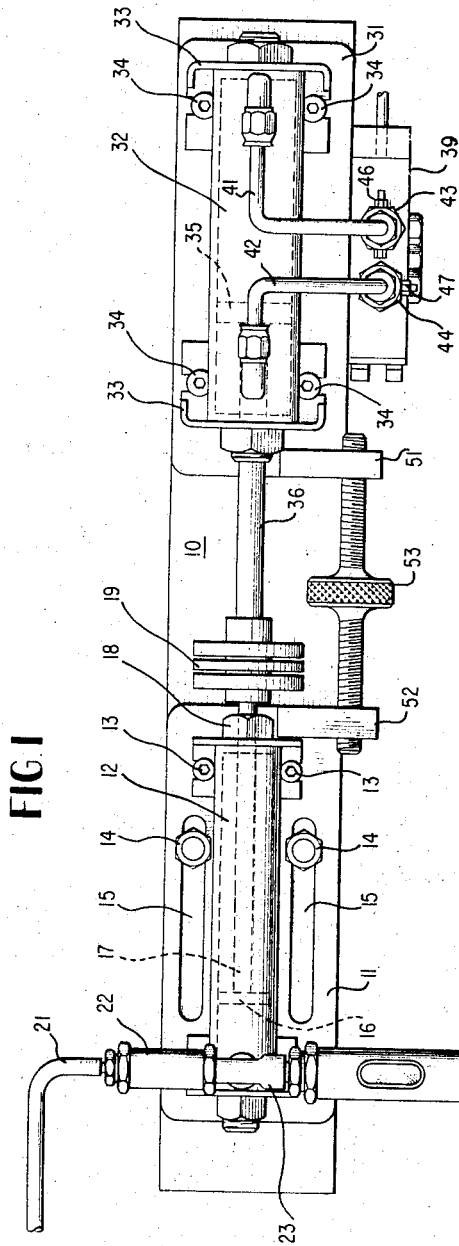
FIG. 1 is a plan view of an intermittent water spray proportioner.

Referring now to the drawings, FIG. 1 shows a proportioner base 10 of suitable construction to hold apparatus according to this invention. On base 10 is mounted cylinder base 11 carrying variable volume cylinder 12 secured thereto by suitable means, such as bolts 13, the base 11 being slideably mounted on base 10 as by loose rivets or bolts 14 engaging slots 15 and arranged parallel to cylinder 12 on a plate-like portion of the base 11 in a conventional manner to permit sliding adjustment of base 11 along base 10. As will be noted hereinafter, this permits adjustment of the motion of a piston 16, shown in dotted line, within cylinder 12 in tightly fitted relationship thereto, which is connected by piston rod 17, also shown in dotted line, extending through stuffing nut 18 to coupling 19, whence it may be operated.

Cylinder 12 connects to a suitable liquid supply, usually water under constant pressure, by means of tube 21, check valve 22 and T connection 23 having a stem portion engaging conduit 24 entering cylinder 12. Valve 22 is preferably of the free-flow check valve type in which water may pass toward cylinder 12 but is prevented from being forced in the opposite direction, thereby to direct any water ejected from cylinder 12 out the opposite end of the T 23 by suitable connections to flow indicator 25 and thence by tube 26, preferably of the flexible hose type, to a spring loaded check valve 27 which is arranged to pass fluid only in the direction from T 23. A suitable check valve design includes a spring urged diaphragm preventing flow in tube 26 until pressure is developed to equal or exceed a preadjusted value for the check valve setting. Check valve 27 exhausts through connector 28 into a spray device such as 29 to be further described hereinafter.

According to the construction thus illustrated and described a constant water supply pressure is maintained in tube 21 adequate to fill a variable volume chamber as at the outer end of cylinder 12 controlled by the positions of piston 16 and piston rod 17. As the piston is moved toward the inner end of the cylinder, the chamber is increased in capacity between piston 16 and the closed end beneath T 23. A quantity of water is thus drawn into the cylinder on each excursion of the piston which is measured by the stroke of the piston, the volume being the product of piston area and the stroke. Thus an instroking movement of the piston charges the cylinder, and an outstroking motion of the piston discharges the measured volume outwardly through tube 26 with a force sufficient to overcome the spring loading of check valve 27 thus to eject a metered quantity of water through mist forming device 29.

Figure 2:
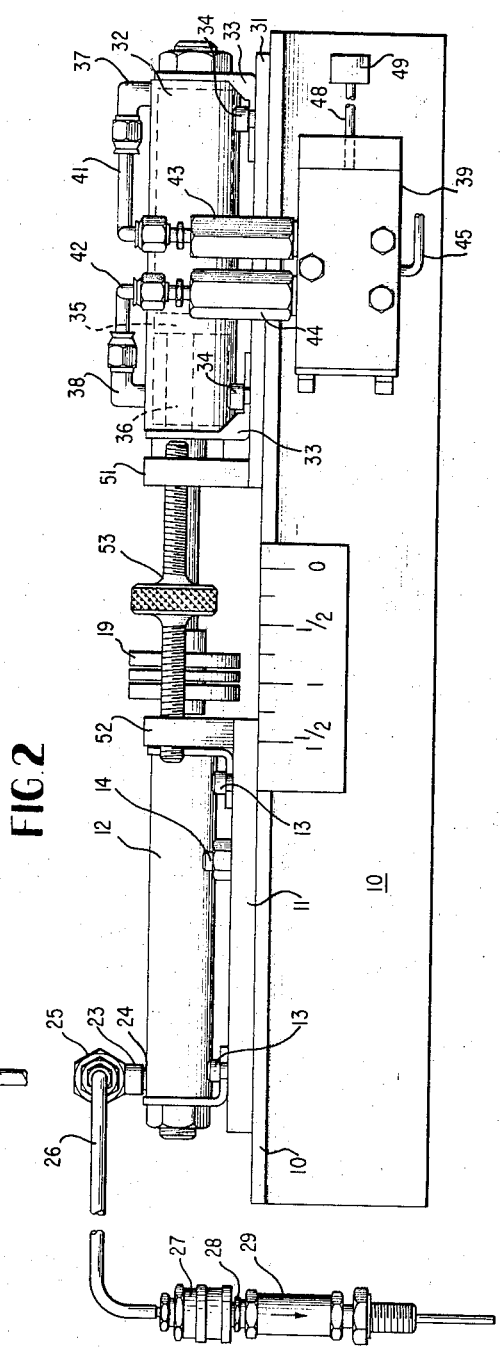
FIG. 2 is an elevational view of the apparatus of FIG. 1.
Figure 3:
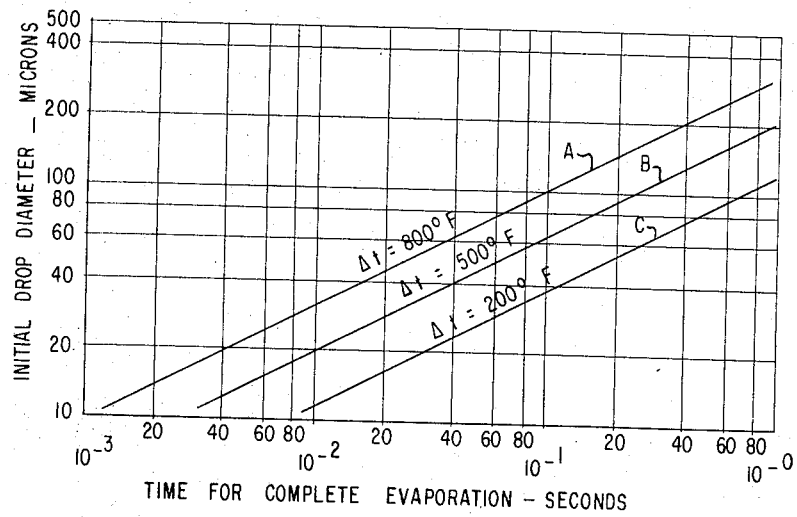
FIG. 3 is a diagrammatic showing of the logarithmic relation of drop sizes to evaporation time at various temperatures.

With further reference to FIGS. 1 and 2, a base plate 31 supports air cylinder 32 by means of ears 33 secured to base plate 31 by bolts 34 which may conveniently pass through to base 10 to fix the position of base plate 31 with respect thereto. Cylinder 32 contains a piston 35 and piston rod 36, shown partly in dotted line, in tight engagement with cylinder 32. Piston rod 36 extends to a connection with piston rod 17 at 19 and provides means for operating the piston 16.

Air cylinder 32 is power operated in a direction parallel to motion of piston 16 and is operated by air pressure admitted to the inner or outer end thereof at fittings 37 and 38 of which fitting 37 admits air to stroke out piston 35 and fitting 38 permits air to stroke in the piston 35, during the two work strokes of the reciprocating piston. Fittings 37 and 38 connect, respectively, at air control valves in assembly 39 by way of tubes 41 and 42 and air control valves 43 and 44. Valve assembly 39 may be selected from suitable commercial units to serve as a pilot valve receiving high pressure air by way of a supply line 45 from a controlled pressure supply. The pilot valve serves to distribute air from the supply line 45 either for stroking in piston 35 or for stroking out this piston. When pilot valve 39 admits air by way of line 41 and fitting 37, the piston is stroked out to eject water from cylinder 12 through check valve 27 to the spray forming device. When pilot valve 39 admits air to cylinder 32 by way of line 42, piston 35 strokes in to draw a new charge of water by way of line 21 into the cylinder 12. The air pressure supply is conveniently variable in pressure but more than adequate to provide the desired speed of operation of the piston 12. Control is effected by way of exhaust speed control valves 43 and 44, which may be arranged either to control the entrance of the air into the cylinder 32 or to control exhaust at one side due to pressure of entering air at the opposite side of piston 35. Arranged in the latter manner, valves 43 and 44 would contain exhaust ports partially closed by needle valves, or the like, schematically illustrated at 46 and 47, for which exhaust ports are not shown.

Pilot valve 39 includes a piston which may be biased to maintain piston 35 in the outstroke position under constant pressure of air by way of line 45 to cylinder 32 via tube 41. Alternatively, valve 39 may be biased in the opposite direction in its condition of rest, but is actuatable in either case by shifting the valve upon admission of a pulse of air by way of pulsed air line 48, preferably controlled from a valve schematically shown at 49, under control of the cycling operations in the forming machine, such as a cammed valve, not shown. Valve 39 functions to control outstroking of piston 35 preferably under control of valve 44 whereby the rate of water delivery from cylinder 12 may be controlled. When control valve 49 admits a pulse of air to pilot valve 39, air may be admitted by way of line 41 to stroke piston 35 and close off air pressure from line 45 to cylinder 32 by way of line 42, which is then permitted to exhaust through a port under control of the air control valve 44 as may be indicated by the adjustment of control handle 47 thereon. Air admitted to the valve 39 is of momentary duration and valve 39 may return under spring action to the unactuated condition whereby air is again admitted to cylinder 32 by way of line 42 thus to stroke the piston 35 inward and draw a new charge of cooling water into cylinder 12. The precise form and mode of operation of the valve 39 and the control mechanism actuating valve 49 is optional and may be reversed in respect to the actuated and nonactuated states by oppositely biasing valve 39 and making appropriate adjustments in the control valves 43 and 44. Obviously, valves 43 and 44 may be varied and may be employed to control the rate of incoming air to either line 41 or 42, as may be desired, to effect the basic rate control for instroking and outstroking of piston 35. As normally used, the rate of reciprocation is high and the durations of the instroke and outstroke may be similar. In either case, one of the valves 43, 44 is effective to control the rate of delivery of water from cylinder 12 to mist forming device 29. The other of these two valves operates to control the rate of instroking of piston 35 and consequently the rate of recharging of cylinder 12.

The aforementioned patent applications disclose the relative importance of drop size in relation to proper cooling of plungers and blank molds. For the purpose of the present application it is important to note that effective cooling requires instantaneous evaporation of droplets as they strike the mold or other heated surface to be cooled. Droplets are preferably less than 30 microns in diameter, although diameters up to 80 microns may be employed under certain circumstances. It is also to be noted that the droplet size obtained is a function of the mass flow ratio in terms of air-to-water masses utilized. In a properly designed nozzle arrangement, droplet sizes range below 40 microns when the air mass is .8 of the consumed water mass and the droplet size falls below 10 microns when air mass equals 1.6 times the water mass ejected at the spray nozzle.

These relationships are shown generally in FIGS. 3 and 4, and it will be appreciated that an intermittent supply of air to atomize water within selected limits within 10 to 40 microns diameter of droplets requires precision of control and of timing as well as measured quantities of water for each injection. It is also a factor in efficient operation that the air flow should continue at least as long as the water flow in order to sweep out of the cooling area the steam formed upon evaporation of the mist.

A further factor to be considered and requiring critical adjustment of time and quantity of water used is that evaporation of each droplet should occur within a period of the order of .01 second, which may be obtained with a difference of temperature between the droplet and surroundings as illustrated at line A of FIG. 3 as 800° F., where a droplet size in excess of 30 microns is satisfactory. At a temperature difference of 500° F. a 30 micron droplet requires about .02 second to evaporate, and at 200° F. difference of temperature about .06 second is required. From this it is seen that the droplet size is a function of the temperature difference between mold surface and droplet, and that lesser temperature differences require smaller droplets to effect complete evaporation within periods of the order of .01 second. Longer evaporation times result in droplets bouncing away from the surface.

The diagram of FIG. 4 shows in cross-hatched regions drop diameters plotted against mass flow ratios for which drop sizes vary within the spray, and are therefore regions to be excluded from practical operation of a spray mist proportioning device. A maximum drop diameter of 80 microns at a ratio of about .55 indicates maximum useable drop diameters of about 80 microns, but such drop sizes would require much too high a temperature difference to be instantly evaporated upon contact with the mold surface. Accordingly, droplet diameters of 40 microns or less are selected and this is accomplished by using air-to-water ratios of .8 or more at practical temperature differences between mold surface and spray mist applied thereto. When the temperature difference is of the order of 500° F. or less the air admitted should exceed in mass the water applied upon each injection operation, and at lower heat flux rates air alone may be an adequate cooling medium.

A further control feature requiring precision of operation and a different adjustment for each type of forming operation relates to the quantity of water to be discharged on each cycle of piston 16 since this piston operation ejects a known quantity of water into the mist forming device. Ordinarily, the quantity of water required will depend directly upon the mass of glass which is formed into an object on each operation of the forming machine. It is also obvious that different rates of operation of the forming machine require corresponding variations in cooling rate which require variations in the quantity of water delivered. When the speeds are increased, additional cooling is required which requires a higher rate of cooling air delivery and this is accompanied by additional water requirements for each stroke of the piston if the drop size is to be retained and the mass flow ratio held constant, as is desirable for maximum forming rates. At higher flux rates it is desirable to increase the water flow and to increase the water flow rate.

Variability of water mass delivered on each injection is achieved by varying the change in volume of the chamber. In FIGS. 1 and 2 this is illustrated in base plate 31 having fixed arm 51 rigidly attached thereto being accordingly fixed in position along base 10. Cylinder base 11 has a similar rigid arm 52 arranged generally parallel to arm 51, and each is threaded to receive a reverse threaded adjusting screw 53, arranged to be manually rotated to draw together arms 51 and 52 when rotated in one direction, and to separate arms 51 and 52 when rotated in the opposite direction. By this means base 11 is adjusted along base 10 thereby to change the length of the stroke for piston 35 as piston rod 17 becomes fully inserted in cylinder 12 through packing nut 18. It will be noted that wide variations in quantity of water delivered may be effected by the adjustment of screw 53, and the duration of each working stroke may be controlled over wide limits by variation in air supply to the valve 39 and the adjustment of valves 43 and 44.

Figure 5:
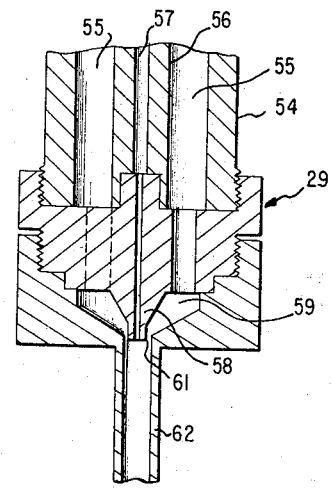
FIG. 5 illustrates an enlarged scale a nozzle suitable for spraying water in water-to-air ratios to be controlled according to this invention.
Figure 4:
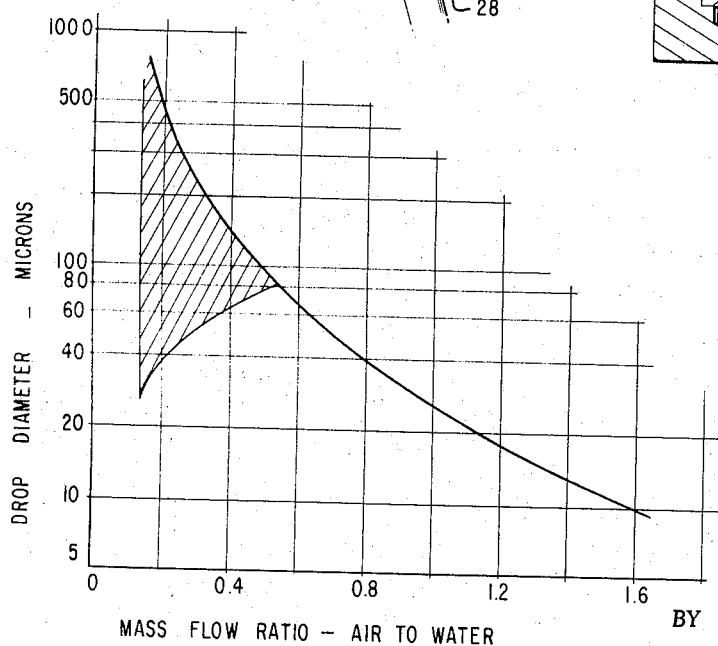
FIG. 4 is a diagrammatic showing of the relation of the drop size to the mass flow ratio of air to water.

By way of illustration, FIG. 5 shows a suitable forming nozzle for a spray mist in which the liquid supply is controlled according to this invention. An air supply tube 54 having air channel 55 therein is connected to apparatus not shown supplying air at the desired rate under control of the forming mechanism. A water tube 56 having channel 57 therein is arranged concentrically within tube 54, in which the channel 57 receives water from spring loaded check valve 27. Water nozzle 58 connects to channel 57 and opens into chamber 59 which is also supplied with air from channel 55. Channel 59 is so formed as to receive the cooling air employed in the cooling process at a confined high speed region 61 forming an orifice about the nozzle 58 so as to efficiently atomize water ejected therethrough from channel 57. A spray tube 62 extends below the orifice 61 and receives a fine mist spray caused by the impingement of high speed air upon the water flowing from orifice 58. Tube 62 is shaped according to the particular cooling operation to be effected and normally has one or more rows of openings therealong to distribute the formed mist uniformly over the surface of a mold arranged in close proximity. Normally a number of mist forming devices as in FIG. 5 would be employed in parallel operation. A plunger mold may be cooled by a single device 29 having a number of rows of openings along the sides of tube 62. Where several spray forming devices are employed for a single mold, they may be connected in parallel by separate connections such as 28 to the check valve 27.

A proportioner according to this invention is effective to control a precisely timed injection of a liquid into a spray nozzle in which the total quantity of liquid is metered and delivered within an interval which is a variable portion of the whole cycling time for the forming machine, adjustment being provided within the proportioner itself. The timing of the injection or shot of liquid is controlled by an exterior signal which may be electrical to operate a solenoid valve, hydraulic or pneumatic to operate a powered valve such as illustrated. Preferably, the cooling liquid is water because of its cheapness and ready availability and its high heat of vaporization. The quantity, timing and rate control have been described with respect to water injection atomized by means of a high velocity air stream surrounding the orifice at the end of the delivery line. Check valve 27 is so loaded and proportioned as to provide at least a minimum pressure in the line 26 before any liquid is delivered therethrough.

Figure 6:
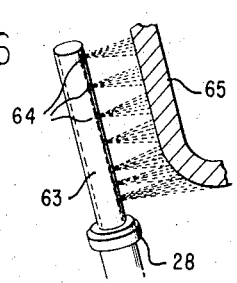
FIG. 6 illustrates an injection type nozzle for atomizing a liquid at fixed pressure and droplet size.

For some purposes in glass formation an air stream impinging on a water stream as in FIG. 5 is inconvenient and unnecessary and the proportioner of this invention may be employed without the use of an air-induced mist. FIG. 6 illustrates one form of nozzle which may be employed directly connected to fitting 28 in lieu of device 29. Nozzle 63 is illustrated as a cylindrical tube having a row of orifices 64 therealong proportioned in size and position, each to produce a homogeneous spray of water drops generally less than 40 microns in diameter which may be directed, for example, against the exterior surface of a blank mold 65 in lieu of cooling by an air blast or by a combined air and water mist as previously described. The proportioner heretofore described has particular utility in providing a suddenly commencing water spray of the described characteristics, which terminates as suddenly as it commences, upon the operation of the check valve 27. The total quantity of water delivered on each blank molding operation is readily adjusted to provide the variations over wide limits required to maintain the heat flux within close limits for accurate control of sag and temper of the glass, without the use of large masses of high velocity air. If desired, a small but steady flow of purging air may be employed in conjunction with the intermittent water spray provided according to this invention. Individual orifices of nozzle 63 shown at 64 are generally proportioned according to practices well known in the fuel injection art whereby liquid droplets of desired maximum dimensions are not exceeded.

It will be noted that this invention provides an improved method of adjusting the relative masses of air and water employed in each injection operation to accurately control the droplet size and the rate of delivery of a spray mist for a cooling operation, and that an improved method of providing at controlled intervals a fixed quantity of liquid at a controlled rate of delivery characterizes the improvement herein disclosed.

While the invention has been described with respect to particular embodiments found to be successful, it will be apparent that it may be practiced otherwise than as specifically shown and described, and applicant intends to include equivalent structure and method variations within the scope of the appended claims.

What is claimed is:

1. Glass mold cooling apparatus, comprising
   an air-actuated liquid mist forming nozzle,
   means for supplying actuating air to said nozzle at a predetermined pressure and supply rate,
   conduit means for conveying sprayable liquid to said nozzle,
   biased check valve means in said conduit means for limiting flow of said liquid to intervals when said liquid is at a pressure exceeding said predetermined pressure,
   stroking means for delivering said liquid in discrete batches through said valve means,
   means for varying the stroke length of said delivery means to vary the size of said batches, and
   means for adjusting the stroking rate during each delivery interval to vary the proportions of air and liquid in said nozzle.

2. Apparatus according to claim 1 wherein said means for delivering liquid comprises volume displacement means in a cylinder supplied with said liquid, a reciprocable fluid-driven actuator coupled to control said displacement means, and means for reciprocating said actuator through successive in and out strokes.

3. Spray generating and metering apparatus for intermittently cooling a parison mold, comprising a metering chamber of variable volume, means supplying water at constant pressure unidirectionally to said metering chamber, means for changing the volume of said chamber in repeating cycles, one cycle for each cooling operation in response to a cycling impulse, first adjustment means for fixing the magnitude of volume change for a sequence of cycles, second adjustment means for variably fixing the rate of change of volume of said chamber, a source of atomizing air supplied at constant rate and limited to intervals of decreases of said volume, means including a spray nozzle for atomizing water expelled from said chamber during decreases of said volume proportioned to provide droplets of less than 40 microns diameter at said air supply rate, and check valve means between said chamber and said nozzle resiliently biased to pass water only during cyclic intervals when pressure to atomize said water to said droplet size is exerted therein.

4. A spray metering device according to claim 3 wherein said means for changing the volume of the metering chamber comprises second piston chamber means valvedly connected to a fluid pressure source for operation at variable rates in opposite directions through like excursions in response to a cycling impulse, and means coupling the second piston means to forcibly change the volume of said metering chamber at a rate controlled by the rate of supply of fluid from the fluid pressure source.

5. In an apparatus for generating a mist in batches of fixed mass and predetermined rate of delivery repeatedly during successive intervals of time, a metering chamber having one movable wall to vary the volume thereof, means feeding a liquid from a source under pressure into said chamber, check valve means for preventing return flow of liquid from the chamber toward said source, biased valve means connected to said chamber for permitting discharge of said liquid only when the pressure in said chamber exceeds a predetermined value larger than the pressure at said source, atomizing means connected to said biased valve means for converting said liquid to a mist during discharge, cyclic means mechanically moving said wall to change the volume of said chamber positively to receive said liquid and negatively to cause delivery of said liquid at said predetermined value, and variable rate control means for operating said cyclic means to cause conversion of liquid to mist at a predetermined rate during each said interval.

6. In apparatus according to claim 5 said means for mechanically moving the wall comprising a double acting piston within a closed cylinder, a source of pressurized fluid, and means admitting said fluid to stroke said piston at a rate varied in accordance with rate of flow of such fluid to said cylinder.

7. In apparatus according to claim 6 means including a variable flow valve between said source and said cylinder for varying the rate of stroking of said piston.

8. In apparatus according to claim 6 said means for controlling the rate of stroking of said piston comprising a source of pressurized fluid connected to said cylinder at one side of said piston and variable escape valve means connected to the cylinder on the opposite side of said piston for varying the rate of release of fluid therein.

9. In apparatus according to claim 5 said means for converting liquid to a mist comprising an orifice connected to receive the output of liquid from said chamber, a source of air pressure delivered to said mist forming means surrounding said orifice wherein said fluid is pulsed in synchronism with delivery of said liquid from said chamber.

References Cited

UNITED STATES PATENTS

| | | | |
|---|---|---|---|
| 1,391,104 | 9/1921 | Gould | 103—38 |
| 1,999,881 | 4/1935 | Lowe | 137—99 |
| 3,203,777 | 8/1965 | Berry et al. | 65—355 |
| 3,235,353 | 2/1966 | Rupli | 65—262 |

DONALL H. SYLVESTER, *Primary Examiner.*

A. D. KELLOGG, *Assistant Examiner.*